(12) United States Patent
Shieh et al.

(10) Patent No.: US 9,483,317 B1
(45) Date of Patent: Nov. 1, 2016

(54) USING MULTIPLE CENTRAL PROCESSING UNIT CORES FOR PACKET FORWARDING IN VIRTUALIZED NETWORKS

(71) Applicant: vArmour Networks, Inc., Mountain View, CA (US)

(72) Inventors: Choung-Yaw Shieh, Palo Alto, CA (US); Marc Woolward, Santa Cruz, CA (US); Yi Sun, San Jose, CA (US)

(73) Assignee: vArmour Networks, Inc., Mountain View, CA (US)

( * ) Notice: Subject to any disclaimer, the term of this patent is extended or adjusted under 35 U.S.C. 154(b) by 0 days.

(21) Appl. No.: 14/828,351

(22) Filed: Aug. 17, 2015

(51) Int. Cl.
   G06F 9/46 (2006.01)
   G06F 9/50 (2006.01)
   G06F 9/455 (2006.01)

(52) U.S. Cl.
   CPC ......... *G06F 9/5083* (2013.01); *G06F 9/45558* (2013.01); *G06F 2009/45591* (2013.01)

(58) Field of Classification Search
   None
   See application file for complete search history.

(56) References Cited

U.S. PATENT DOCUMENTS

| | | |
|---|---|---|
| 6,578,076 B1 | 6/2003 | Putzolu |
| 6,651,099 B1 | 11/2003 | Dietz et al. |
| 6,765,864 B1 | 7/2004 | Natarajan et al. |
| 6,970,459 B1 | 11/2005 | Meier |
| 6,983,325 B1 | 1/2006 | Watson et al. |
| 6,992,985 B1 | 1/2006 | Das |
| 7,028,179 B2 | 4/2006 | Anderson et al. |
| 7,062,566 B2 | 6/2006 | Amara et al. |
| 7,397,794 B1 | 7/2008 | Lacroute et al. |
| 7,464,407 B2 | 12/2008 | Nakae et al. |
| 7,542,455 B2 | 6/2009 | Grayson et al. |
| 7,620,986 B1 | 11/2009 | Jagannathan et al. |
| 7,742,414 B1 | 6/2010 | Iannaccone et al. |
| 7,774,837 B2 | 8/2010 | McAlister |
| 7,804,787 B2 | 9/2010 | Brandyburg et al. |
| 7,844,839 B2 * | 11/2010 | Palmer ............... H04L 67/1008 709/201 |
| 7,849,495 B1 | 12/2010 | Huang et al. |
| 7,900,240 B2 | 3/2011 | Terzis et al. |
| 7,986,938 B1 | 7/2011 | Meenan et al. |
| 8,051,460 B2 | 11/2011 | Lum et al. |

(Continued)

FOREIGN PATENT DOCUMENTS

WO  WO2011012165  2/2011

OTHER PUBLICATIONS

Specification, U.S. Appl. No. 14/673,679, filed Mar. 30, 2015.

(Continued)

*Primary Examiner* — Gregory A Kessler
(74) *Attorney, Agent, or Firm* — Carr & Ferrell LLP

(57) ABSTRACT

Systems and methods for using a plurality of processing cores for packet processing in a virtualized network environment are described herein. An example system can comprise a scheduler operable to initiate a processing core of the plurality of processing cores. The processing core is operable to process a plurality of data packets. Based on the determination that the processing core exceeds a threshold processing capacity associated with the processing core, the scheduler sequentially initiates at least one subsequent processing core. The at least one subsequent processing core has a corresponding threshold processing capacity and is operable to process data packets of the plurality of data packets in excess of threshold processing capacities associated with preceding processing cores. Thus, the threshold processing capacities associated with the preceding processing cores are not exceeded.

16 Claims, 6 Drawing Sheets

(56) References Cited

U.S. PATENT DOCUMENTS

| | | | |
|---|---|---|---|
| 8,214,679 B2* | 7/2012 | Ishikawa | G06F 1/3228 713/323 |
| 8,259,571 B1 | 9/2012 | Raphel et al. | |
| 8,274,912 B2 | 9/2012 | Wray et al. | |
| 8,353,021 B1 | 1/2013 | Satish et al. | |
| 8,464,255 B2* | 6/2013 | Nathuji | G06F 9/5077 718/1 |
| 8,490,153 B2 | 7/2013 | Bassett et al. | |
| 8,726,343 B1 | 5/2014 | Borzycki et al. | |
| 8,798,055 B1 | 8/2014 | An | |
| 8,955,093 B2 | 2/2015 | Shieh et al. | |
| 8,984,114 B2 | 3/2015 | Shieh et al. | |
| 9,038,151 B1 | 5/2015 | Chua et al. | |
| 2002/0019886 A1 | 2/2002 | Sanghvi et al. | |
| 2002/0031103 A1 | 3/2002 | Wiedeman et al. | |
| 2003/0014665 A1 | 1/2003 | Anderson et al. | |
| 2003/0123481 A1 | 7/2003 | Neale et al. | |
| 2003/0135625 A1 | 7/2003 | Fontes et al. | |
| 2003/0177389 A1 | 9/2003 | Albert et al. | |
| 2003/0236985 A1 | 12/2003 | Ruuth | |
| 2004/0062204 A1 | 4/2004 | Bearden et al. | |
| 2004/0093513 A1 | 5/2004 | Cantrell et al. | |
| 2004/0095897 A1 | 5/2004 | Vafaei | |
| 2004/0172618 A1 | 9/2004 | Marvin | |
| 2004/0214576 A1 | 10/2004 | Myers et al. | |
| 2005/0060573 A1 | 3/2005 | D'Souza | |
| 2005/0114288 A1 | 5/2005 | Dettinger et al. | |
| 2005/0201343 A1 | 9/2005 | Sivalingham et al. | |
| 2006/0050696 A1 | 3/2006 | Shah et al. | |
| 2006/0085852 A1 | 4/2006 | Sima | |
| 2006/0101520 A1 | 5/2006 | Schumaker et al. | |
| 2006/0137009 A1 | 6/2006 | Chesla | |
| 2006/0150250 A1 | 7/2006 | Lee et al. | |
| 2007/0019621 A1 | 1/2007 | Perry et al. | |
| 2007/0079308 A1 | 4/2007 | Chiaramonte et al. | |
| 2007/0192863 A1 | 8/2007 | Kapoor et al. | |
| 2008/0083011 A1 | 4/2008 | McAlister et al. | |
| 2008/0086772 A1 | 4/2008 | Chesla | |
| 2008/0155239 A1 | 6/2008 | Chowdhury et al. | |
| 2008/0168135 A1 | 7/2008 | Redlich et al. | |
| 2008/0222375 A1 | 9/2008 | Kotsovinos et al. | |
| 2008/0301770 A1 | 12/2008 | Kinder | |
| 2009/0103524 A1 | 4/2009 | Mantripragada et al. | |
| 2009/0182835 A1 | 7/2009 | Aviles et al. | |
| 2009/0228966 A1 | 9/2009 | Parfene et al. | |
| 2009/0268667 A1 | 10/2009 | Gandham et al. | |
| 2010/0043068 A1 | 2/2010 | Varadhan et al. | |
| 2010/0095367 A1 | 4/2010 | Narayanaswamy | |
| 2010/0104094 A1 | 4/2010 | Takashima | |
| 2010/0125900 A1 | 5/2010 | Dennerline et al. | |
| 2010/0132031 A1 | 5/2010 | Zheng | |
| 2010/0189110 A1 | 7/2010 | Kambhampati et al. | |
| 2010/0235880 A1 | 9/2010 | Chen et al. | |
| 2010/0235902 A1 | 9/2010 | Guo et al. | |
| 2010/0333165 A1 | 12/2010 | Basak et al. | |
| 2011/0003580 A1 | 1/2011 | Belrose et al. | |
| 2011/0010515 A1 | 1/2011 | Ranade | |
| 2011/0013776 A1 | 1/2011 | McAlister | |
| 2011/0069710 A1 | 3/2011 | Naven et al. | |
| 2011/0075667 A1 | 3/2011 | Li et al. | |
| 2011/0225624 A1 | 9/2011 | Sawhney et al. | |
| 2011/0249679 A1 | 10/2011 | Lin et al. | |
| 2011/0263238 A1 | 10/2011 | Riley et al. | |
| 2012/0017258 A1 | 1/2012 | Suzuki | |
| 2012/0036567 A1 | 2/2012 | Senese et al. | |
| 2012/0131685 A1 | 5/2012 | Broch et al. | |
| 2012/0185913 A1 | 7/2012 | Martinez et al. | |
| 2013/0086383 A1 | 4/2013 | Galvao de Andrade et al. | |
| 2013/0086399 A1 | 4/2013 | Tychon et al. | |
| 2013/0097692 A1 | 4/2013 | Cooper et al. | |
| 2013/0111542 A1 | 5/2013 | Shieh | |
| 2013/0152187 A1 | 6/2013 | Strebe et al. | |
| 2013/0212670 A1 | 8/2013 | Sutardja et al. | |
| 2013/0263245 A1 | 10/2013 | Sun et al. | |
| 2013/0329595 A1 | 12/2013 | Scholz | |
| 2014/0173731 A1 | 6/2014 | Mantripragada et al. | |
| 2014/0245423 A1 | 8/2014 | Lee | |
| 2014/0279527 A1 | 9/2014 | Duke et al. | |
| 2014/0283030 A1 | 9/2014 | Moore et al. | |
| 2014/0298469 A1 | 10/2014 | Marion et al. | |
| 2015/0052519 A1 | 2/2015 | Yu | |
| 2015/0186296 A1 | 7/2015 | Guidry | |
| 2015/0229656 A1 | 8/2015 | Shieh | |

OTHER PUBLICATIONS

Specification, U.S. Appl. No. 14/673,640, filed Mar. 30, 2015.
Specification, U.S. Appl. No. 14/657,282, filed Mar. 13, 2015.
Non-Final Office Action, Jul. 1, 2015, U.S. Appl. No. 14/673,640, filed Mar. 30, 2015.
Non-Final Office Action, Jul. 7, 2015, U.S. Appl. No. 14/673,679, filed Mar. 30, 2015.
Non-Final Office Action, Jul. 16, 2015, U.S. Appl. No. 14/677,827, filed Apr. 2, 2015.
Non-Final Office Action, Jul. 31, 2015, U.S. Appl. No. 14/677,755, filed Apr. 2, 2015.
Wonghirunsombat, Ekgapark et al., "A Centralized Management Framework of Network-based Intrusion Detection and Prevention System," 2013 10th International Joint Conference on Computer Science and Software Engineering (JCSSE).
Non-Final Office Action, Jan. 5, 2016, U.S. Appl. No. 14/480,318, filed Sep. 8, 2014.
Final Office Action, Jun. 9, 2016, U.S. Appl. No. 14/677,755, filed Apr. 2, 2015.

* cited by examiner

USING MULTIPLE CENTRAL PROCESSING UNIT CORES FOR PACKET FORWARDING IN VIRTUALIZED NETWORKS

TECHNICAL FIELD

The present disclosure relates generally to data processing and, more specifically, to methods and systems for optimizing usage of multiple processing units in virtualized environments.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Data centers are conventionally used to house computer systems and associated components (for example, telecommunications and storage systems). A data center generally includes a set of redundant devices, such as power supplies and data communications connections, environmental controls, and security devices. Trends in global technological development bring transformations to technical solutions related to organization of data centers. Such transformations relate to standardization, virtualization, automation, and security of the data centers. Virtualization technologies can be used to replace or consolidate multiple data center equipment. Virtualization may help to lower capital and operational expenses and reduce energy consumption.

Virtualized data centers are popular due to their ability to enable multiple virtual machines to share the same hardware in an over-subscribed way, because the usage of processing units (such as central processing units (CPUs)) and memory of virtual machines may not be in need of peak capacity at the same time. However, CPU utilization associated with traditional packet forwarding in a physical networking environment does not align with the needs of virtualized networks. In a physical networking environment, since the CPUs are entirely owned and utilized for network or security purposes, the CPU utilization practices need to utilize a run-to-complete model to use the CPU all the time, even in a low load scenario. Furthermore, tasks need to be divided to be processed in multiple CPUs at the same time. Thus, existing environments are not optimized for virtualized networks as they consume all available CPU resources regardless of the load. Additionally, constant running of high-priority tasks on all available CPUs prevents other applications or virtual machines from using the CPUs.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for using a plurality of processing cores for packet processing in a virtualized network environment. An example method may commence with initiating a processing core of the plurality of processing cores. The processing core may be operable to process a plurality of data packets. The method may further include determining that the processing core exceeds a threshold processing capacity associated with the processing core. Based on the determination, at least one subsequent processing core may be sequentially initiated. The at least one subsequent processing core may have a corresponding threshold processing capacity. Additionally, the at least one subsequent processing core may be operable to process data packets of the plurality of data packets in excess of threshold processing capacities associated with preceding processing cores, thereby ensuring that the threshold processing capacities associated with the preceding processing cores are not exceeded.

Also provided is a system for using a plurality of processing cores for packet processing in a virtualized network environment. The system may comprise a scheduler. The scheduler may be operable to initiate a processing core of the plurality of processing cores. The processing core may be operable to process a plurality of data packets. Furthermore, the scheduler may determine that the processing core exceeds a threshold processing capacity associated with the processing core. Based on the determination, at least one subsequent processing core may be sequentially initiated. The at least one subsequent processing core may have a corresponding threshold processing capacity and be operable to process data packets of the plurality of data packets in excess of threshold processing capacities associated with preceding processing cores. Thus, the threshold processing capacities associated with the preceding processing cores are not exceeded.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
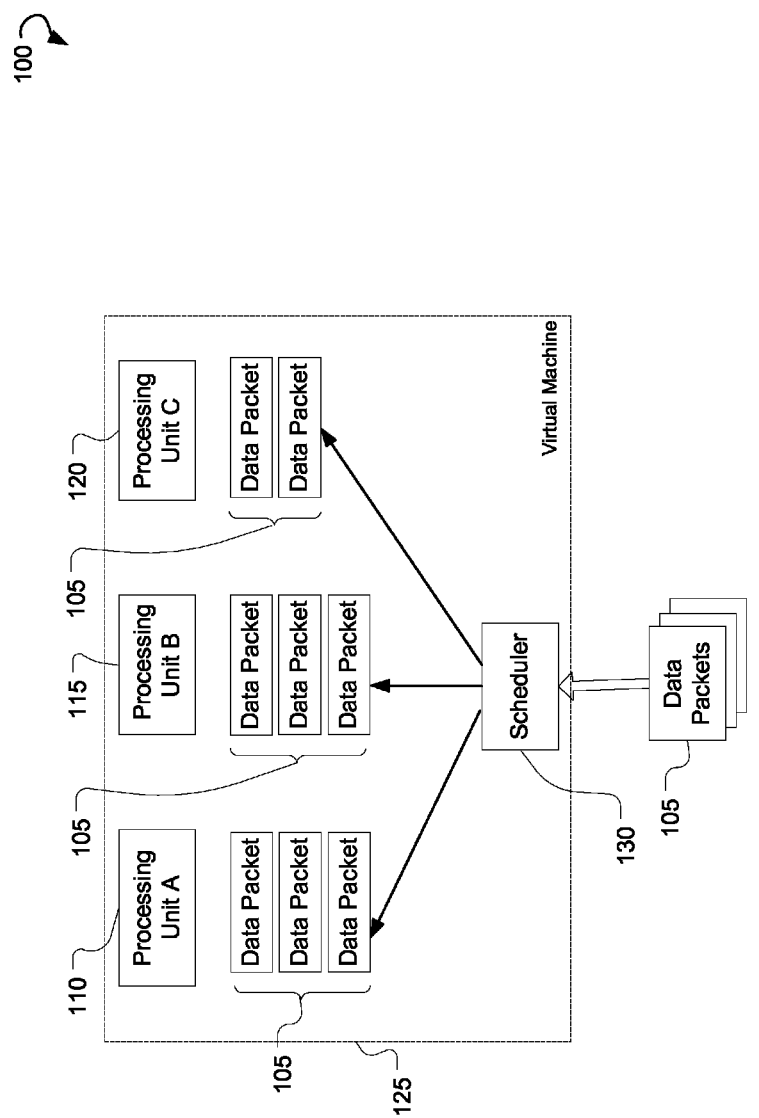
FIG. 1 illustrates an environment within which systems and methods for using a plurality of processing cores for packet processing in a virtualized network environment can be implemented, in accordance with some embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

This disclosure provides methods and systems for using a plurality of processing cores for packet processing in a virtualized network environment. Network virtualization includes combining hardware and software network resources and network functionality into a single, software-based virtual network. Network virtualization brings the need to support switching between different virtual machines within the same network. The virtualized network environment may be controlled by a virtual network interface card (also referred to as a virtual network interface controller). More specifically, each virtual machine may instantiate the virtual network interface card to connect to a software driver, also referred to as a driver or a scheduler, enabling sending and receiving network traffic. The driver is a system component (such as a software component) that runs in a kernel mode (i.e., an unrestricted mode) of a processing unit, such as a CPU, and has access to core operating system data. The driver is provided to gain access to data that is available only in kernel mode of the processing unit.

Virtualized networks may be developed as multi-core systems, i.e., systems having multi-core processors. A multi-core processor is a computing component with two or more independent processing units (called "processing cores" or "cores"), which read and execute program instructions.

Thus, the present disclosure describes optimizing packet processing when using multiple processing cores in a virtualized network. Most multi-core systems used in conventional physical environments have a packet-receiving queue for each processing core. Each processing core may be operable to perform a plurality of tasks, such as data packet forwarding (to other components of the network), data packet processing, and so forth. The driver may forward data packets to all the packet-receiving queues evenly, regardless of how many data packets are waiting to be processed. Such scheduling of the data packets may cause extra expenses and waste resources of the processing cores, as the scheduling assumes all process cores are fully allocated to the driver regarding processing loading. In this case, the resources of the processing core are utilized to pull packets from queue and process packet forwarding (which requires a real-time response), without yielding the processing cores to other tasks or virtual machines.

Utilizing processing cores as described in the present disclosure can minimize context switching (or switching between different activities) for the processing cores and release available resources of the processing cores to other virtual machines, thereby maximizing the processing core utilization. More specifically, a method described herein utilizes a dynamic queue distribution algorithm to distribute data packets depending on the workload in the virtualized network environment. The virtualized network environment may have a plurality of processing cores. The total number of the processing cores may be a predetermined number of processing cores with the total capacity satisfying the network workload requirements. The dynamic queue distribution algorithm includes forwarding all incoming data packets to a first processing core of the plurality of processing cores. When the traffic volume of data packets increases beyond a certain threshold, a second processing core may be initiated; specifically, the incoming data packets may be forwarded to the first processing core and the second processing core. Therefore, more traffic volume may trigger forwarding the data packets to an additional processing core, one processing core at a time. Eventually, in a fully loaded scenario, the data packets may be forwarded to all available processing cores.

When the traffic volume reduces, the dynamic queue distribution algorithm may change to follow the workload. If the traffic volume reduces to a certain threshold, the data packets are no longer forwarded to the last initiated processing core. Eventually, the last initiated processing core does not have any data packets to process, and the resources of the last initiated processing core can be released to other virtual machines.

By consolidating the packet processing to a limited number of processing cores instead of distributing packets evenly to all available processing cores, the dynamic queue distribution algorithm can balance real-time packet processing and general-purpose processing, reduce the change of context switching of processing cores, and increase a cache hit rate (represented as a percentage of requests that are served from a cache of a server for retrieving the desired data from the cache). It allows more efficiency processing cores sharing among virtual machines. This improves overall processing performance.

FIG. 1 illustrates an environment 100 within which systems and methods for using a plurality of processing cores for packet processing in a virtualized network environment can be implemented, in accordance with some embodiments. The environment 100 may include a virtualized environment in a distributed network (not shown), in which incoming network traffic shown as data packets 105 is forwarded to processing units (shown as processing unit A 110, processing unit B 115, and processing unit C 120) of a virtual machine 125. The processing units 110, 115, and 120 may include CPUs.

The environment 100 may further include a software driver shown as a scheduler 130 responsible for receiving the data packets 105 and scheduling the data packets 105 to one or more of the processing units 110, 115, and 120.

Figure 2:
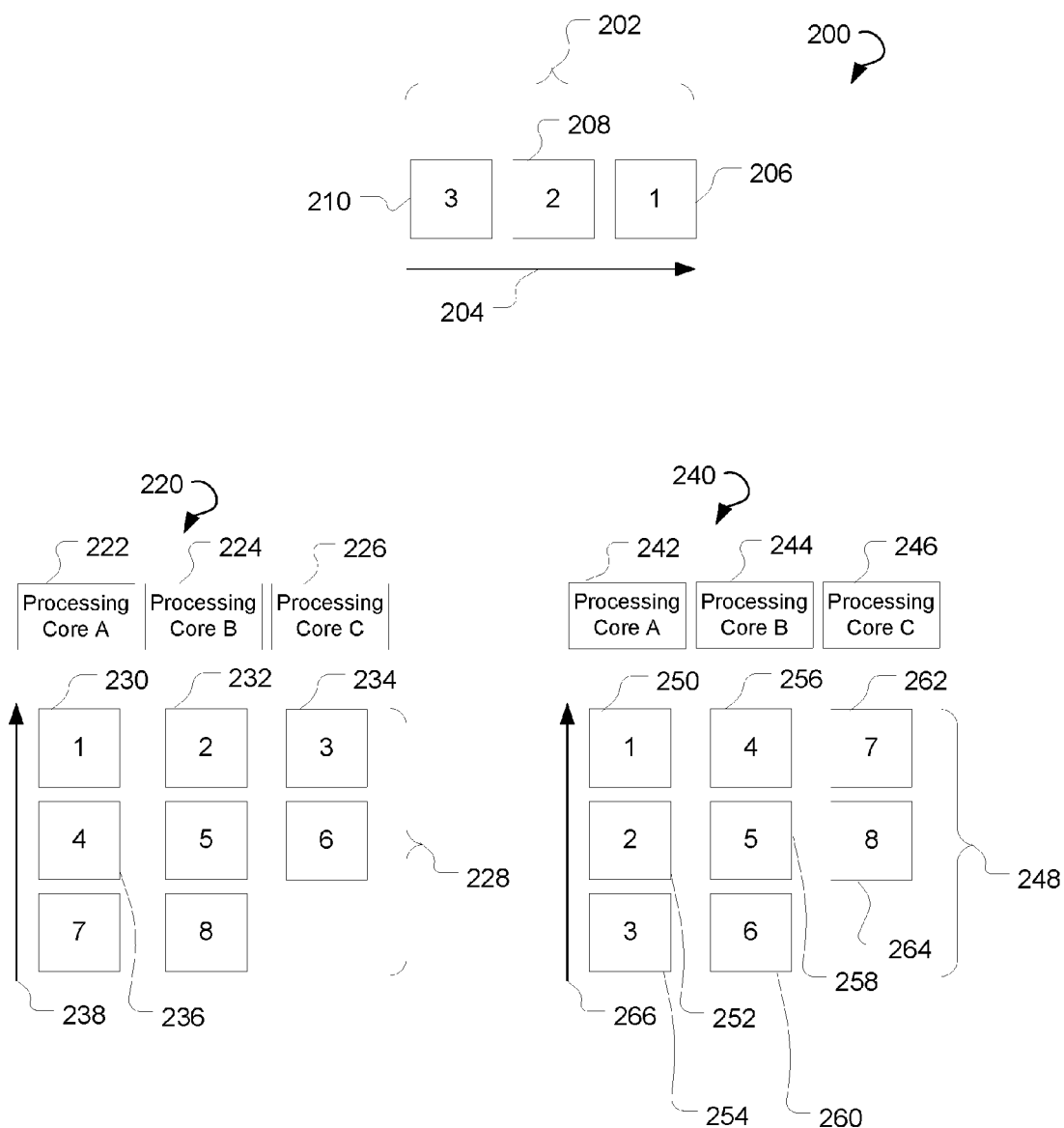
FIG. 2 shows schematic diagrams for packet processing in various network environments, in accordance with certain embodiments.

FIG. 2 shows schematic diagrams for packet processing, according to example embodiments. Diagram 200 shows data packets 202 received by a scheduler (not shown). An arrow 204 shows an order in which the data packets are forwarded to the scheduler, where a data packet 206 is received by the scheduler first, a data packet 208 is received by the scheduler second, and a data packet 210 is received by the scheduler third.

Diagram 220 schematically shows conventional scheduling of data packets in physical environments. A physical environment (not shown) may have a plurality of processing cores, shown as a processing core A 222, a processing core B 224, and a processing core C 226. A scheduler (not shown) may schedule data packets 228 to each of the processing core A 222, the processing core B 224, and the processing core C 226 in parallel. More specifically, a first data packet 230 (being the data packet received by the scheduler first) may be scheduled to the processing core A 222, a second data packet 232 (being the data packet received by the scheduler second) may be scheduled to the processing core B 224, and a third data packet 234 (being the data packet received by the scheduler third) may be scheduled to the processing core C 226. Subsequently received data packets may be sequentially scheduled to the processing core A 222, the processing core B 224, and the processing core C 226. For example, a fourth data packet 236 (being the data packet received forth by the scheduler) may be scheduled to the processing core A 222, and so forth.

An arrow 238 shows a packet queue for each of the processing core A 222, the processing core B 224, and the processing core C 226. In an example embodiment, the packet queue associated with the processing core A 222 may include data packets received first, forth, and seventh by the scheduler. Similarly, the packet queue associated with the processing core B 224 may include data packets received second, fifth, and eighth by the scheduler, while the packet queue associated with the processing core C 226 may include data packets received third and sixth by the scheduler.

Diagram 240 schematically shows scheduling data packets in virtualized network environments. A virtualized network environment (not shown) may have a plurality of processing cores, shown as a processing core A 242, a processing core B 244, and a processing core C 246. A scheduler (not shown) may schedule data packets 248 to each of the processing core A 242, the processing core B 244, and the processing core C 246 according to processing capacity of each of the processing core A 242, the processing core B 244, and the processing core C 246. More specifically, a first data packet 250 (being the data packet received first by the scheduler) may be scheduled to the processing core A 242, a second data packet 252 (being the data packet received second by the scheduler) may be also scheduled to the processing core A 242, as well as a third data packet 254 (being the data packet received third by the scheduler) may be scheduled to the processing core A 242. Upon forwarding the third data packet 254 to the processing core A 242, the scheduler may determine that the processing core A 242 exceeds a threshold processing capacity associated with the processing core A 242. Therefore, the scheduler may schedule subsequently received data packets to the processing core B 244. For example, a data packet 256, a data packet 258, and a data packet 260 may be scheduled to the processing core B 244. Upon forwarding the data packet 260 to the processing core B 244, the scheduler may determine that the processing core B 244 exceeds a threshold processing capacity associated with the processing core B 244. Therefore, the scheduler may schedule subsequently received data packets to the processing core C 246, such as a data packet 262 and a data packet 264.

The threshold processing capacity may be different for each of the processing core A 242, the processing core B 244, and the processing core C 246 depending on the purpose of each of the processing core A 242, the processing core B 244, and the processing core C 246. For example, the processing core A 242 and the processing core B 244 may be dedicated for data packet forwarding, while the processing core C 246 may be dedicated to data packet processing. Therefore, the threshold processing capacity for the processing core A 242 and the processing core B 244 may be higher than the threshold processing capacity for the processing core C 246. The processing core C 246 may use a bigger portion of its processing capacity, for example 70 percent, for data packet processing, while a smaller portion of its processing capacity, for example, 30 percent, may be used for data packet forwarding.

An arrow 266 shows a packet queue for each of the processing core A 242, the processing core B 244, and the processing core C 246. In an example embodiment, the packet queue associated with the processing core A 242 may include data packets received first, second, and third by the scheduler. Similarly, the packet queue associated with the processing core B 244 may include data packets received fourth, fifth, and sixth by the scheduler, while the packet queue associated with the processing core C 246 may include data packets received seventh and eighth by the scheduler.

In an example embodiment, the scheduler may send to the first processing core A 242 an amount of the data packets 105 corresponding to a threshold processing capacity of the first processing core A 242. All subsequent data packets 105 may be forwarded to the processing core B 244.

According to another example embodiment, upon determining that the first processing core A 242 exceeds the threshold processing capacity, the scheduler may forward all received data packets 105 to the processing core A 242 and the processing core B 244 by distributing the data packets evenly between the processing core A 242 and the processing core B 244.

Thus, a processing core-based scaling of data packet forwarding may be used in the virtualized network environment. Moreover, in the virtualized network environment, each of the processing core A 242, the processing core B 244, and the processing core C 246 may serve a shared resource (i.e., the processing capacity of each of the processing core A 242, the processing core B 244, and the processing core C 246 may be shared between a plurality of virtual machines). Therefore, sequential distribution of the data packets may allow for not loading all available processing cores, but freeing up processing capacities of the processing cores, which do not currently participate in packet forwarding, to other virtual machines.

Figure 3:
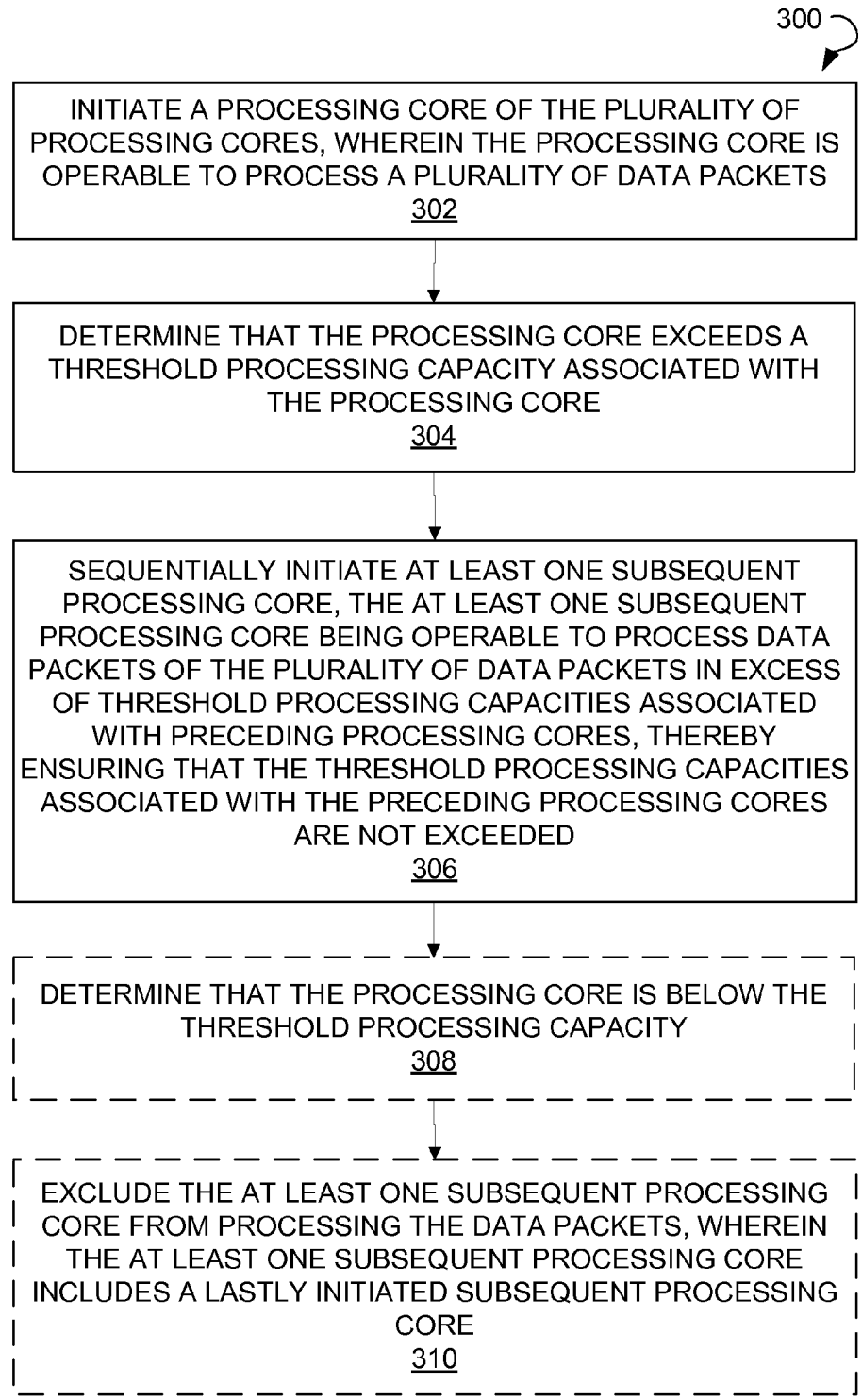
FIG. 3 is a flow chart illustrating a method for using a plurality of processing cores for packet processing in a virtualized network environment, in accordance with some example embodiments.

FIG. 3 is a flow chart illustrating a method 300 for using a plurality of processing cores for packet processing in a virtualized network environment, in accordance with some example embodiments. The method 300 may commence with initiating a processing core of the plurality of processing cores at operation 302. The processing core may be operable to process a plurality of data packets. The method 300 may continue with determining that the processing core exceeds a threshold processing capacity associated with the processing core at operation 304. The method 300 may further include sequentially initiating at least one subsequent processing core at operation 306. The sequential initiation of the at least one subsequent processing core may be based on the determining that the processing core exceeds a threshold processing capacity associated with the processing core. The at least one subsequent processing core may have a corresponding threshold processing capacity. The at least one subsequent processing core may be operable to process data packets of the plurality of data packets in excess of threshold processing capacities associated with preceding processing cores. Therefore, it may be ensured that the threshold processing capacities associated with the preceding processing cores are not exceeded. In an example embodiment, the at least one subsequent processing core may be operable to process the plurality of data packets until the subsequent processing core exceeds the corresponding threshold processing capacity.

In an example embodiment, the method 300 may optionally include determining that the processing core is below the threshold processing capacity at optional operation 308. At optional operation 310, the at least one subsequent processing core may be excluded from processing the data packets. The at least one subsequent processing core may include a last initiated subsequent processing core.

In a further example embodiment, the processing core and all sequentially initiated processing cores including the last initiated subsequent processing core may be associated with a first virtual machine. Based on the excluding the last initiated subsequent processing core from processing of the data packets, the last initiated subsequent processing core may be assigned to a second virtual machine. Therefore, processing resources of the last initiated subsequent processing core may be used for the purposes of the second virtual machine.

In an example embodiment, the method 300 may further include determining a number of the data packets forwarded by each of subsequent processing cores per unit of time with respect to processing capacities, while each of the subsequent processing cores may have a certain processing capacity. Thereby, a current workload of each of the subsequent processing cores may be determined. The threshold processing capacity may constitute a predetermined portion of the total capacity of the processing core.

In some example embodiments, the data packets sent to the processing core and each of subsequent processing cores may be placed into a plurality of packet queues. The processing core and each of the subsequent processing cores may be associated with one packet queue of the plurality of packet queues. The method 300 may further include monitoring a number of the data packets in each of the plurality of packet queues. Additionally, the method 300 may include ascertaining that the number of the data packets in a packet queue associated with the processing core decreases for a lesser number of data packets than a number of data packets placed into the packet queue per a unit of time. In such a case, determination that the processing core exceeds the threshold processing capacity mentioned with respect to operation 302 may be based on such ascertaining.

Figure 4:
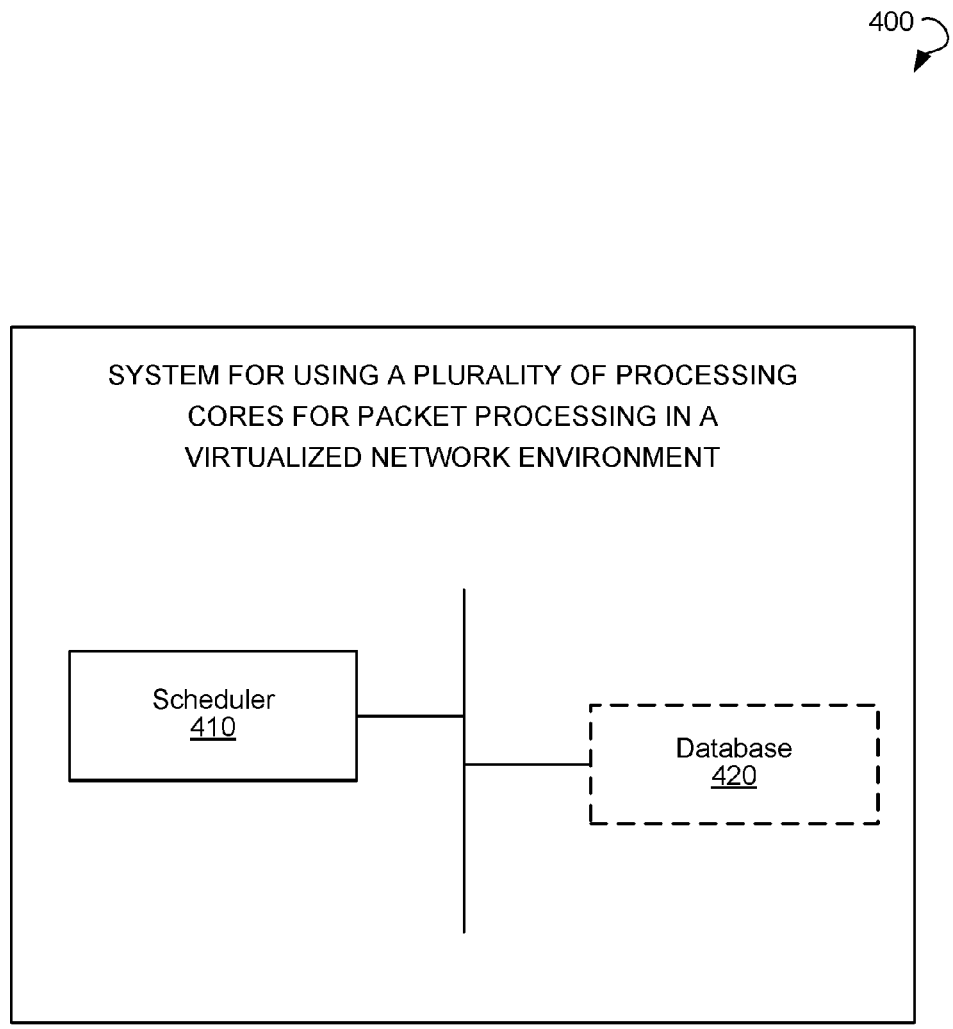
FIG. 4 is a block diagram showing various modules of a system for using a plurality of processing cores for packet processing in a virtualized network environment, in accordance with certain embodiments.

FIG. 4 is a block diagram showing various modules of a system 400 for using a plurality of processing cores for packet processing in a virtualized network environment, in accordance with certain embodiments. The system 400 may comprise a scheduler 410 and an optional database 420. In various embodiments, the system 400 may reside outside of the organization in a virtualized data center outside control of the organization or be provided as a cloud service.

The scheduler 410 may act as a driver enabling sending and receiving of network traffic. The scheduler 410 may be operable to initiate a processing core of the plurality of processing cores. The processing core may be operable to process a plurality of data packets. The scheduler 410 may be further operable to determine that the processing core exceeds a threshold processing capacity associated with the processing core. Based on the determining, scheduler 410 may be operable to sequentially initiate at least one subsequent processing core. The at least one subsequent processing core may have a corresponding threshold processing capacity. The at least one subsequent processing core may be operable to process data packets of the plurality of data packets in excess of threshold processing capacities associated with preceding processing cores to ensure that the threshold processing capacities associated with the preceding processing cores are not exceeded. In an example embodiment, the at least one subsequent processing core may be operable to process the plurality of data packets until the subsequent processing core exceeds the corresponding threshold processing capacity. In some embodiments, the threshold processing capacity may constitute a predetermined portion of a total capacity of the processing core.

In further example embodiments, the scheduler 410 may be further operable to determine that the processing core is below the threshold processing capacity. Based on the determining, the scheduler 410 may be operable to exclude the at least one subsequent processing core from processing the data packets. The at least one subsequent processing core may include the last initiated subsequent processing core.

In some embodiments, the processing core and the last initiated subsequent processing core may be associated with a first virtual machine. In such an embodiment, the scheduler 410 may be further operable to assign, based on the excluding, the last initiated subsequent processing core to a second virtual machine.

Each of the subsequent processing cores have a certain processing capacity. The scheduler 410 may be operable to determine a number of the data packets forwarded by each of subsequent processing cores per unit of time with respect to processing capacities to determine a current workload of each of the subsequent processing cores.

The data packets sent to the processing core and each of subsequent processing cores may be placed into a plurality of packet queues. Each of the processing core and the subsequent processing cores may be associated with one of the plurality of packet queues. The scheduler 410 may be further operable to monitor a number of the data packets in the each of the plurality of packet queues. Each of the processing core and the subsequent processing cores may be operable to pull the data packets from one of the plurality of packet queues. Pulling of the data packets from the packet queue may be performed, for example, by sending a signal by the processing core indicating that the processing core is available for receiving a further data packet.

Additionally, the scheduler 410 may ascertain that the number of data packets in a packet queue associated with the processing core decreases for a lesser number of data packets than a number of data packets placed into the packet queue per a unit of time. Based on such ascertaining, it may be determined that the processing core exceeds the threshold processing capacity.

In a further example embodiment, the scheduler 410 may determine that a number of data packets placed into a packet queue associated with a processing core does not change within a predetermined unit of time. The number of data packets placed into the packet queue may not change in case of a failure of the processing core or in case the processing core is busy with processing a high-priority task. Therefore, in case of such determination, the scheduler 410 may forward further data packets to a subsequent processing core. Additionally, the data packets, which were placed into the packet queue that does not change, may be resent to the subsequent processing core.

According to another example embodiment, a processing core may receive a high-priority task. The processing core may send a signal to the scheduler 410 informing that the processing core is no longer available for data packet forwarding. Upon receiving such a signal, the scheduler 410 may send further data packets to a subsequent processing core.

Additionally, a security policy of the virtualized network environment may change, and a processing core, which forwards data packets associated with a first virtual machine, may be assigned to a second virtual machine. The processing core may send a signal to the scheduler 410 informing that the processing core is no longer available for data packet forwarding. Upon receiving such signal, the scheduler 410 may send further data packets to a subsequent processing core.

The optional database 420 may store computer-readable instructions for execution by the scheduler 410.

Figure 5:
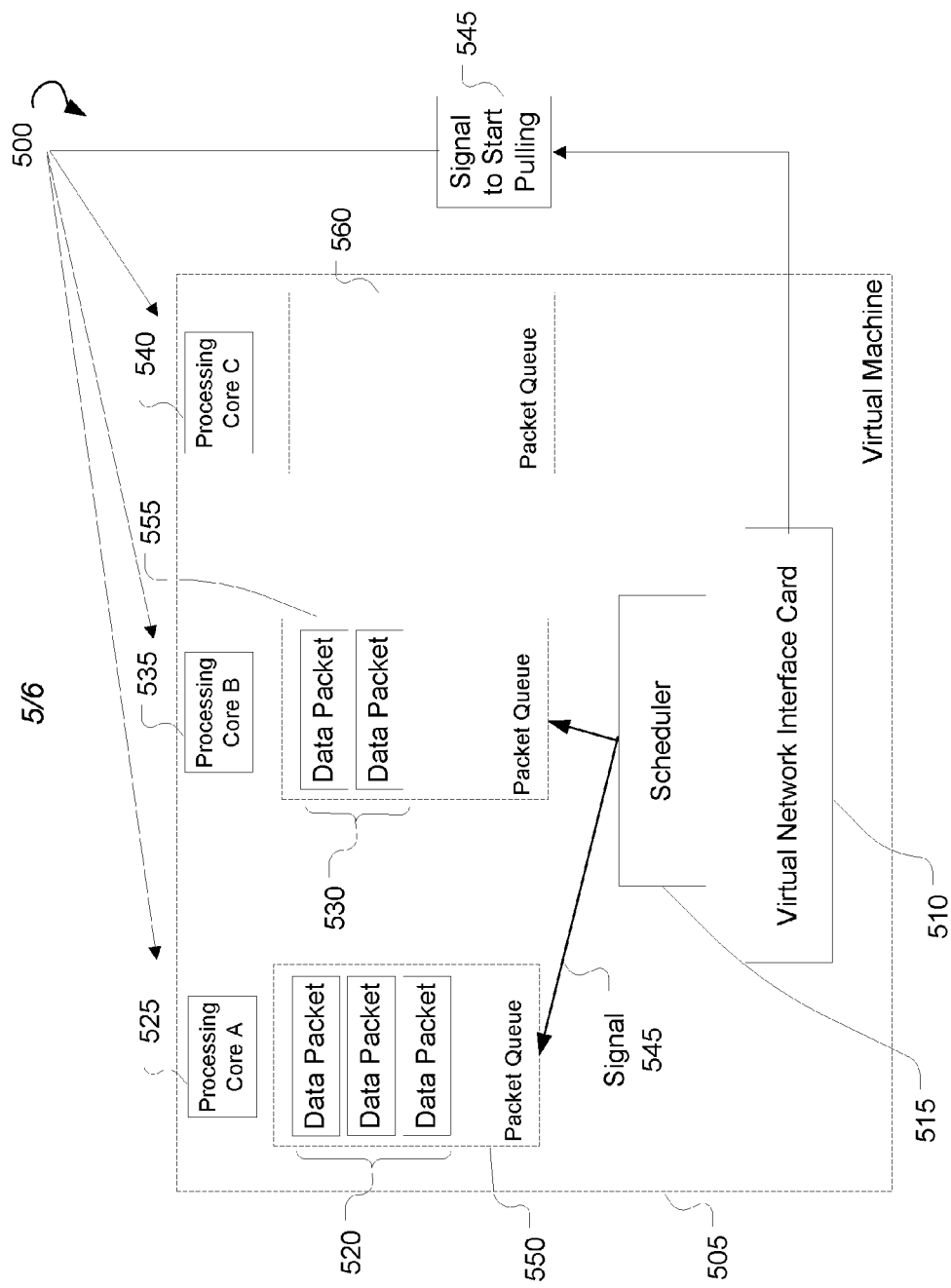
FIG. 5 shows a schematic diagram of data packet distribution within a virtual machine in a virtualized network environment, in accordance with an example embodiment.

FIG. 5 shows a schematic diagram 500 of data packet distribution within a virtual machine 505 in a virtualized network environment. The virtual machine 505 may be controlled by a virtual network interface card 510. More specifically, the virtual network interface card 510 may be operable to connect to a scheduler 515 (being a software driver enabling sending and receiving network traffic).

The scheduler 515 may forward received data packets 520 to a first processing core shown as a processing core A 525 until the processing core A 525 exceeds a predetermined threshold capacity associated with the processing core A 525. Data packets 530 received after determining that the processing core A 525 exceeds the predetermined threshold capacity may be forwarded to a second processing core shown as a processing core B 535. The data packets 520 forwarded to the processing core A 525 may be placed into a packet queue 550 and the data packets 530 forwarded to the processing core B 535 may be placed to a packet queue 555. Therefore, the scheduler 515 may be operable to send a signal 545 to the processing core B 535 instructing to start pulling data packets from the packet queue 555. Upon receiving the signal 545, the processing core B 535 may start pulling the data packets 530.

In case the processing core B 535 does not exceed a predetermined threshold capacity associated with the processing core B 535, the scheduler 515 may not forward the data packets to a third processing core shown as a processing core C 540. In such case, a packet queue 560 associated with the processing core C 540 may be empty.

In general, the scheduler 515 may be operable to send the signal 545 to each of the processing core A 525, the processing core B 535, and the processing core C 540 instructing to start pulling data packets from the packet queue 550, the packet queue 555, or the packet queue 560, respectively.

In some embodiments, the scheduler 515 may make a decision to forward data packets to the processing core B 535 when the packet queue 550 of the processing core A 525 reaches a predetermined amount (for example, the packet queue 550 reaches 90 percent).

Figure 6:
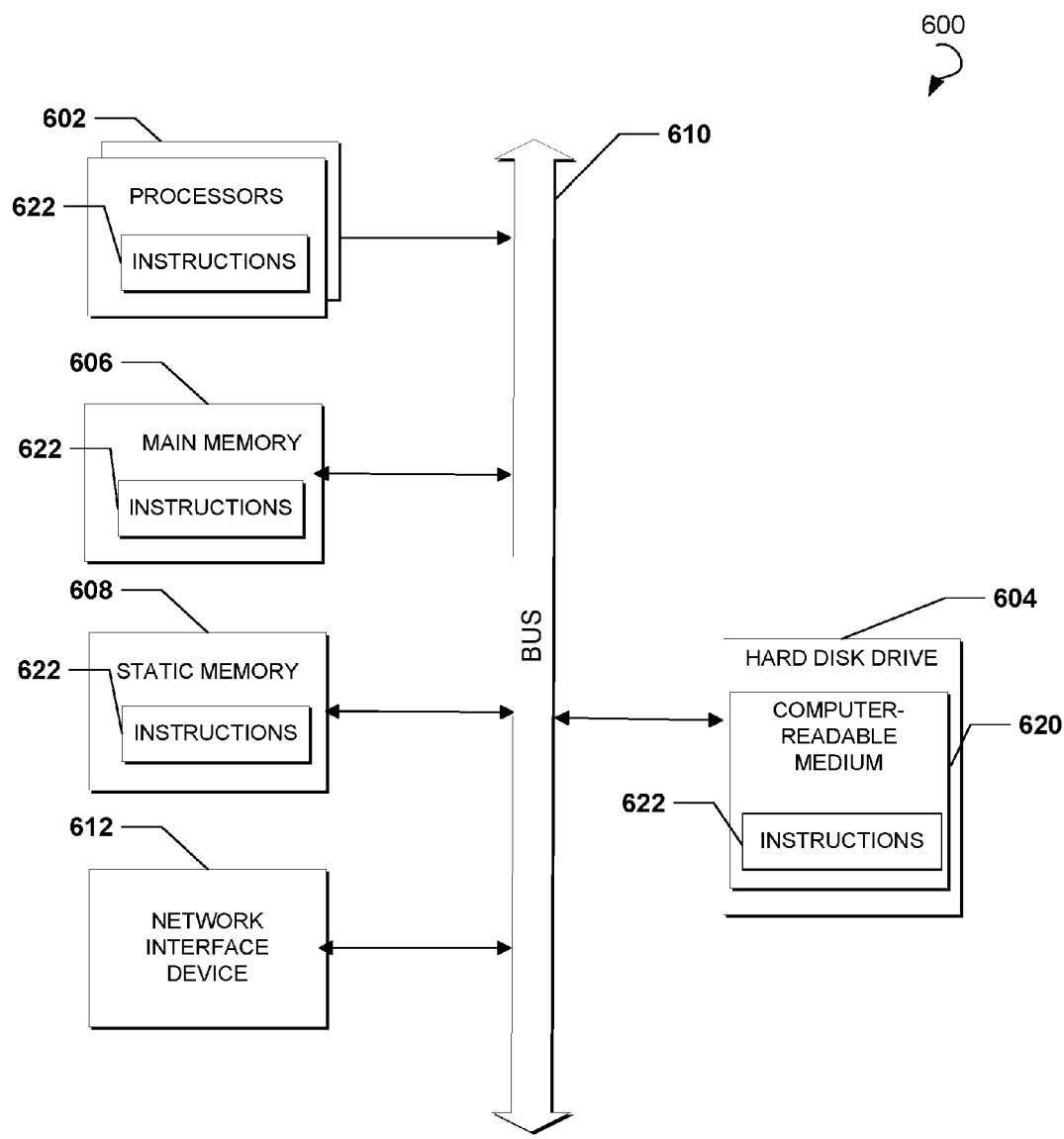
FIG. 6 shows a diagrammatic representation of a computing device for a machine in the exemplary electronic form of a computer system, within which a set of instructions for causing the machine to perform any one or more of the methodologies discussed herein can be executed.

FIG. 6 shows a diagrammatic representation of a computing device for a machine in the exemplary electronic form of a computer system 600, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor or multiple processors 602, a hard disk drive 604, a main memory 606, and a static memory 608, which communicate with each other via a bus 610. The computer system 600 may also include a network interface device 612. The hard disk drive 604 may include a computer-readable medium 620, which stores one or more sets of instructions 622 embodying or utilized by any one or more of the methodologies or functions described herein. The instructions 622 can also reside, completely or at least partially, within the main memory 606, within the static memory 608 and/or within the processors 602 during execution thereof by the computer system 600. The main memory 606 and the processors 602 also constitute computer-readable media.

While the computer-readable medium 620 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, JavaScript, Go, or other compilers, assemblers, interpreters or other computer languages or platforms.

Thus, systems and methods for using a plurality of processing cores for packet processing in a virtualized network environment are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for using a plurality of processing cores for packet processing in a virtualized network environment, the system comprising:
a computer-implemented scheduler operable to:
initiate a processing core of the plurality of processing cores such that the processing core is operable to process a first plurality of data packets associated with a first virtual machine;

receive a first data packet associated with the first virtual machine;

determine that the processing core exceeds a first threshold processing capacity associated with the processing core;

based on the determining, initiate a subsequent processing core such that the subsequent processing core is operable to process data packets of the first plurality of data packets in excess of the first threshold processing capacity, the subsequent processing core having a first portion of a processing capacity associated with data packet forwarding and a second portion of the processing capacity associated with data packet processing such that a second threshold processing capacity associated with the subsequent processing core is less than the first threshold processing capacity;

forward the first data packet to a first queue associated with the subsequent processing core;

receive a second data packet associated with the first virtual machine;

ascertain that the processing core is below the first threshold processing capacity associated with the processing core;

based on the ascertaining, re-initiate the subsequent processing core such that the subsequent processing core is operable to process a second plurality of data packets associated with a second virtual machine; and forward the second data packet to a second queue associated with the processing core.

2. The system of claim 1, wherein the subsequent processing core is operable to process the second plurality of data packets until the subsequent processing core exceeds the second threshold processing capacity.

3. The system of claim 1, wherein the computer-implemented scheduler is further operable to:

determine a number of data packets forwarded by the subsequent processing core per unit of time with respect to processing capacities to determine a current workload of the subsequent processing core, the subsequent processing core having a processing capacity.

4. The system of claim 1, wherein the first threshold processing capacity constitutes a predetermined portion of a total capacity of the processing core.

5. The system of claim 1, wherein data packets sent to the processing core and the subsequent processing core are placed into a plurality of packet queues, wherein each of the processing core and the subsequent processing core is associated with one of the plurality of packet queues.

6. The system of claim 5, wherein the computer-implemented scheduler is further operable to monitor a number of the data packets in each of the plurality of packet queues.

7. The system of claim 6, wherein the computer-implemented scheduler is further operable to ascertain that the number of the data packets in a packet queue associated with the processing core is less than a number of data packets placed into the packet queue per a unit of time, wherein the determining that the processing core exceeds the first threshold processing capacity is based on the ascertaining.

8. The system of claim 5, wherein each of the processing core and the subsequent processing core is operable to pull the data packets from one of the plurality of packet queues.

9. A method for using a plurality of processing cores for packet processing in a virtualized network environment, the method comprising:

initiating a processing core of the plurality of processing cores such that the processing core is operable to process a first plurality of data packets associated with a first virtual machine;

receiving a first data packet associated with the first virtual machine;

determining that the processing core exceeds a first threshold processing capacity associated with the processing core;

based on the determining, initiating a subsequent processing core such that the subsequent processing core is operable to process data packets of the first plurality of data packets in excess of the first threshold processing capacity, the subsequent processing core having a first portion of a processing capacity associated with data packet forwarding and a second portion of the processing capacity associated with data packet processing such that a second threshold processing capacity associated with the subsequent processing core is less than the first threshold processing capacity;

forwarding the first data packet to a first queue associated with the subsequent processing core;

receiving a second data packet associated with the first virtual machine;

ascertaining that the processing core is below the first threshold processing capacity associated with the processing core;

based on the ascertaining, re-initiating the subsequent processing core such that the subsequent processing core is operable to process a second plurality of data packets associated with a second virtual machine; and forwarding the second data packet to a second queue associated with the processing core.

10. The method of claim 9, wherein the subsequent processing core is operable to process the second plurality of data packets until the subsequent processing core exceeds the second threshold processing capacity.

11. The method of claim 9, further comprising:

determining a number of data packets forwarded by the subsequent processing core per unit of time with respect to processing capacities to determine a current workload of the subsequent processing core, the subsequent processing core having a processing capacity.

12. The method of claim 9, wherein the first threshold processing capacity constitutes a predetermined portion of a total capacity of the processing core.

13. The method of claim 9, wherein data packets sent to the processing core and the subsequent processing core are placed into a plurality of packet queues, wherein each of the processing core and the subsequent processing core is associated with one of the plurality of packet queues.

14. The method of claim 13, further comprising monitoring a number of the data packets in the each of the plurality of packet queues.

15. The method of claim 14, further comprising ascertaining that the number of the data packets in a packet queue associated with the processing core decreases for a lesser number of data packets than a number of data packets placed into the packet queue per a unit of time, wherein the determining that the processing core exceeds the first threshold processing capacity is based on the ascertaining.

16. A non-transitory computer-readable storage medium having a program embodied thereon, the program being executable by a processor to perform a method for packet processing in a virtualized network environment, the method comprising:

initiate a processing core of a plurality of processing cores such that the processing core is operable to process a first plurality of data packets associated with a first virtual machine;

receive a first data packet associated with the first virtual machine;

determine that the processing core exceeds a first threshold processing capacity associated with the processing core;

based on the determining, initiate a subsequent processing core such that the subsequent processing core is operable to process data packets of the first plurality of data packets in excess of the first threshold processing capacity, the subsequent processing core having a first portion of a processing capacity associated with data packet forwarding and a second portion of the processing capacity associated with data packet processing such that a second threshold processing capacity associated with the subsequent processing core is less than the first threshold processing capacity;

forward the first data packet to a first queue associated with the subsequent processing core;

receive a second data packet associated with the first virtual machine;

ascertain that the processing core is below the first threshold processing capacity associated with the processing core;

based on the ascertaining, re-initiate the subsequent processing core such that the subsequent processing core is operable to process a second plurality of data packets associated with a second virtual machine; and forward the second data packet to a second queue associated with the processing core.

\* \* \* \* \*